United States Patent [19]
Sabet et al.

[11] Patent Number: 5,722,361
[45] Date of Patent: Mar. 3, 1998

[54] INTERNAL COMBUSTION ENGINE WITH PISTONS THAT ROTATE ABOUT A CENTER LINE

[75] Inventors: Huschang Sabet, Maybachstrasse 16, D-70469 Stuttgart; Willi Springer, Goeppingen; Dietrich Eckhardt, Aichwald, all of Germany

[73] Assignee: Huschang Sabet, Stuttgart, Germany

[21] Appl. No.: 591,642

[22] PCT Filed: Jul. 12, 1994

[86] PCT No.: PCT/EP94/02272

§ 371 Date: Jan. 24, 1996

§ 102(e) Date: Jan. 24, 1996

[87] PCT Pub. No.: WO95/03479

PCT Pub. Date: Feb. 2, 1995

[30]  Foreign Application Priority Data

Jul. 26, 1993 [DE] Germany ............. 43 24 997.3

[51] Int. Cl.$^6$ .................................. F02B 53/10
[52] U.S. Cl. ........................... 123/205; 123/245
[58] Field of Search ....................... 123/205, 245; 418/34

[56] References Cited

U.S. PATENT DOCUMENTS

| | | | |
|---|---|---|---|
| 988,319 | 4/1911 | Edqvist | 418/34 |
| 1,536,245 | 2/1925 | Thelin | 123/245 |
| 3,973,526 | 8/1976 | Kokochak. | |

FOREIGN PATENT DOCUMENTS

| | | | |
|---|---|---|---|
| 138 669 | 9/1934 | Austria. | |
| 0 035 136 | 9/1981 | European Pat. Off.. | |
| 1027779 | 2/1953 | France. | |
| 2689564 | 10/1993 | France | 123/245 |
| 441 508 | 3/1927 | Germany. | |
| 26 06 360 | 8/1977 | Germany. | |
| 973 891 | 11/1976 | U.S.S.R.. | |
| WO86/06786 | 11/1986 | WIPO. | |

*Primary Examiner*—Michael Koczo
*Attorney, Agent, or Firm*—Flynn, Thiel, Boutell & Tanis, P.C.

[57] ABSTRACT

An internal combustion engine with rotating pistons works on the basis of the cat and mouse principle. The charge is axially exchanged over one of the housing lids (28) and the adjacent rotary side disk (24). The combustion chambers (34) are formed by axially open recesses in the pistons (24) of the outer rotor (12) which communicate transversely to the axial direction with the adjacent working chambers (20). The fuel is supplied by injection nozzles (30) oriented in the corresponding housing lid (28) in the direction of the rotary side disk (24).

21 Claims, 11 Drawing Sheets

INTERNAL COMBUSTION ENGINE WITH PISTONS THAT ROTATE ABOUT A CENTER LINE

FIELD OF THE INVENTION

The invention relates to an internal combustion engine with pistons that rotate about a center line, having a circular-cylindrical rotor housing closed off by a housing lid on the drive side and on the drive opposing side, an outer rotor rotating with a constant speed in the rotor housing about its center axis, and carrying a rotor side disk on the drive side and on the drive opposing side, and an inner rotor rotating with an irregular speed inside of the outer rotor about the center axis, whereby the outer rotor has several radially inwardly pointing pistons rigidly connected with one another and the inner rotor has opposed a corresponding number of radially outwardly pointing pistons rigidly connected with one another engaging between two pistons of the outer rotor defining thereby each two working chambers, and whereby a combustion chamber is associated with each working chamber, and each combustion chamber communicates alternately through a control window with stationary inlet and outlet openings.

BACKGROUND AND SUMMARY OF THE INVENTION

In a conventional internal combustion engine of this type (EP-B-0 035 136) the stationary inlet and outlet openings are arranged spaced from one another in the peripheral direction in the sleeve of the circular-cylindrical rotor housing, whereas the control windows are arranged in the axial center area of the outer rotor evenly distributed over its periphery and are designed as radially inwardly tapered recesses arranged symmetrically with respect to the axial center plane of the pistons. These recesses transfer into trough-shaped combustion chambers defined by edge-open recesses in the pistons. Tests with internal combustion engines of this type resulted often in different performances from one motor to another motor and consumptions of force was probably due to changing frictional and sealing behavior of the sealing rings engaging the cylinder path. Furthermore, the absolutely necessary arrangement of a seal between the control windows of the rotor side disk for sealing off the outlet and inlet openings against the oil chamber and against one another is very complicated and expensive with respect to the machining because of the cylindrical surface. Furthermore, the exhaust and suction pipes sitting on the periphery of the rotor housing result in a relatively large front surface of the motor.

Starting out from this the basic purpose of the invention is to develop a rotary piston internal combustion engine, which enables an improved high-pressure operation with little friction and load losses, a more efficient sealing system with improved manufacturing efficiency, and results in a reduction of the engine front surface.

To attain this purpose the characteristics disclosed in Patent claim 1 are suggested. Further advantageous embodiments and developments of the invention result from the subclaims.

The invention is based on the thinking that with a simplification of the contact surfaces to be sealed against one another between rotor and housing, through the use of the sealing system in a flat surface, a higher reliability in the high-pressure operation can be achieved. In order to accomplish this, the invention suggests that the stationary inlet and outlet openings are arranged spacially from one another on a theoretical inscribed circle of one of the housing lids and the control windows in the rotor side disk facing the respective housing lid, and that the combustion chambers are formed by recesses in the outer rotor pistons, which recesses are open axially in direction of the control windows and communicate transversely thereto with the adjacent working chambers.

A preferred embodiment of the invention provides that the inlet and outlet openings are arranged in the housing lid on the drive opposing side and the control windows are arranged in the rotor side disk on the drive opposing side. This measure creates sufficient space for storing the aggregates effecting the charge exchange and, if necessary, the ignition. A further improvement in this respect is achieved by a gear chamber for storing the driving mechanism not being arranged as has been done previously on the drive opposing side and the drive side, but only on the drive side of the rotor housing.

The control windows can have either a circular contour or an oval contour elongated in peripheral direction of the theoretical inscribed circle. The combustion chambers are accordingly advantageously formed by an essentially circular-cylindrical or oval-cylindrical hollow space with an outer surface open at its edge over the entire combustion chamber height toward the side of the adjacent working chambers. In order to guarantee a fissure-free connection to the control window, it is advantageous when the opposed pistons have on their flanks facing the pistons an edge-open recess supplementing the adjacent combustion chamber. The combustion chambers extend advantageously over a fraction, preferably ¼ to ¾, of the axial outer rotor dimension. To optimize the combustion chamber dimensions, the pistons can have convexly curved flanks in the area of the combustion chamber outer surface openings and the opposed pistons can have corresponding concavely curved flanks.

To optimize the charge exchange, it is furthermore advantageous when the stationary inlet and/or outlet openings have an oval contour elongated in peripheral direction of the respective theoretical inscribed circle, whereby in order to avoid overflow losses the elongated outlet openings can be divided in the peripheral direction of the respective theoretical inscribed circle while forming a preoutlet and a main outlet into two areas sealed off against one another and connected to different outlet channels.

In order to achieve a reliable and reduced friction sealing between the individual control windows, as such, and between the stationary inlet and outlet openings, it is suggested according to a preferred embodiment of the invention that sealing bars be arranged on the side of the rotor side disks provided with the control windows on the side facing the associated housing lid. The sealing bars surround the control openings and define in the area between the control openings the inlet and outlet openings radially inwardly and outwardly, and axially bridge the gap between the rotor side disk and the housing lid. It is thereby important that in the area between the control openings there is provided at least one essentially radially aligned sealing bar connecting the sealing bars lying radially on the inside and on the outside, which sealing bar avoids overflow losses between adjacent inlet and outlet openings. The respective housing lid consists advantageously for weight reasons of a light metal, preferably an aluminum alloy, and carries at least in the area of the sealing bar resting against it a hard material coating preferably of Nikasil (nickel with silizium carbide occlusion).

The rotary piston internal combustion engine of the invention can be operated either as a Diesel motor or a benzine motor. In the first case it is possible to arrange in the area between each inlet and outlet opening of the respective housing lid an injection nozzle for fuel, which nozzle is aligned in direction of the rotor side disk. In the latter case each one spark plug is arranged in the area between each inlet and outlet opening of the housing lid or in the area of the control windows of the outer rotor, which spark plug is controlled synchronously with the motor speed.

The injection nozzle for Diesel fuel can be designed as an axis-parallel mounted peg-type nozzle or inclined mounted hole-type nozzle. For high injection pressures it is also possible to provide an injection nozzle designed as a pump nozzle, which is controlled preferably through a cam plate rotating with the outer rotor, a roller shaft, and a rocker arm.

BRIEF DESCRIPTION OF DRAWINGS

The invention will be discussed in greater detail hereinafter in connection with one exemplary embodiment schematically illustrated in the drawings, in which:

FIG. 10a is a cross-sectional view of the combustion chamber showing the injection nozzle in various positions near the center of the opposed piston;

FIG. 10b is a cross-sectional view along the cross-sectional line 10—10 of FIG. 10a;

DETAILED DESCRIPTION

The rotary piston internal combustion engine consists essentially of a motor housing 10, an outer rotor 12, which has four pistons 14 arranged at equal angular distances from one another projecting radially inwardly, and of an inner rotor 16 rotatably supported within the outer rotor 12, and rotating with an irregular speed. The inner rotor 16 with four radially outwardly projecting winglike opposed pistons 18 is received by the spaces between each two of the pistons 14 of the outer rotor 20. In the reciprocal area of engagement of the pistons 14 and of the opposed pistons 18 a total of eight working chambers 20 are formed, the volume of which is periodically reduced and enlarged through the back and forth swinging of the opposed pistons 18. The working chambers 20 are defined on the front side by rotor side disks 22, 24 connected fixed against rotation to the outer rotor, whereas the rotor housing 10 is closed off by housing lids 26, 28 on the front side.

Figure 10:
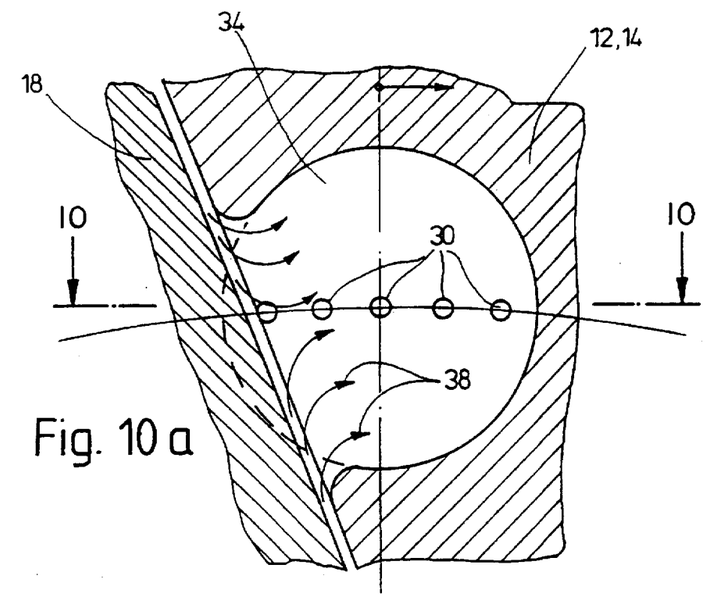
Figure 12:
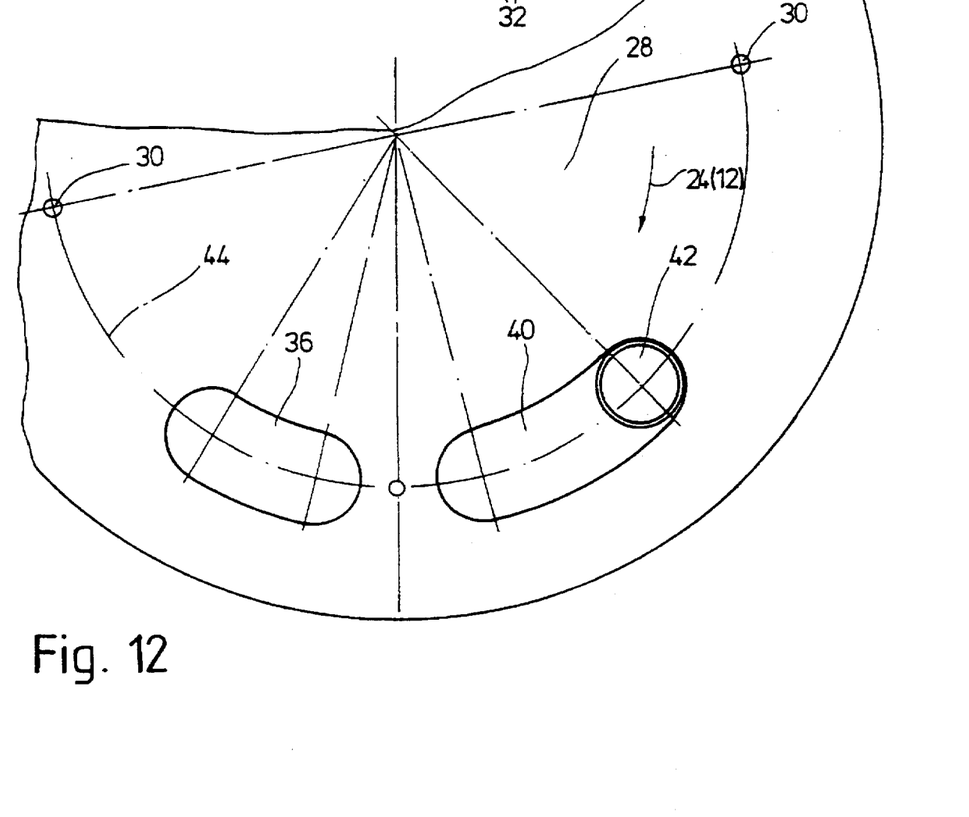
FIG. 12 is a sectional top view of the housing lid with inlet and outlet openings on the drive opposing side.

The exemplary embodiments illustrated in the drawings are Diesel motors, in which the fuel is supplied through two injection nozzles 30 arranged at an equal distance from one another in the housing lid 28 on the drive opposing side. The fuel is injected through the stationary injection nozzles 30 through a total of eight control windows 32 in the rotor disk 24 on the drive opposing side into a corresponding number of combustion chambers 34 in the passing outer rotor 12, after fresh air was earlier sucked through the inlet openings 36 and the control windows 32 into the associated working chamber 20 and was compressed by the opposed piston 18 in the respective combustion chamber 34 to an ignition temperature. As can be seen in a schematic illustration in FIGS. 10a and 10b, the ignition occurs near the upper dead center position of the opposed piston 18 when the outer rotor 12 passes the injection nozzle 30 over a stretch of approximately 2° to 6° toward the upper dead center position so that due to the spacial shifting of the combustion chamber 34 relative to the injection point 30, a good mixing of the fuel with the compressed air occurs in the combustion chamber. A further contribution for the good mixing comes from the compressed air 38 flowing from the gap narrowing down in advance of the dead center position between the piston 14 and the opposed piston 18 into the combustion chamber 34. The combustion gases expand after the ignition drives the pistons 14 and the opposed pistons 18 apart, and subsequently escape through the control window 32 into the elongated outlet opening 40, into which a sealed preoutlet 42 is integrated in order to avoid an overflow of exhaust gases into the adjacent inlet opening 36. The outlet openings 40, the inlet openings 36, and the injection nozzles 30 are arranged on a common inscribed circle 44 of the housing lid 28 on the drive opposing side. The arrow 24 (12) indicates in FIG. 12 the direction of rotation of the side disk 24 of the outer rotor 12.

Figure 1:
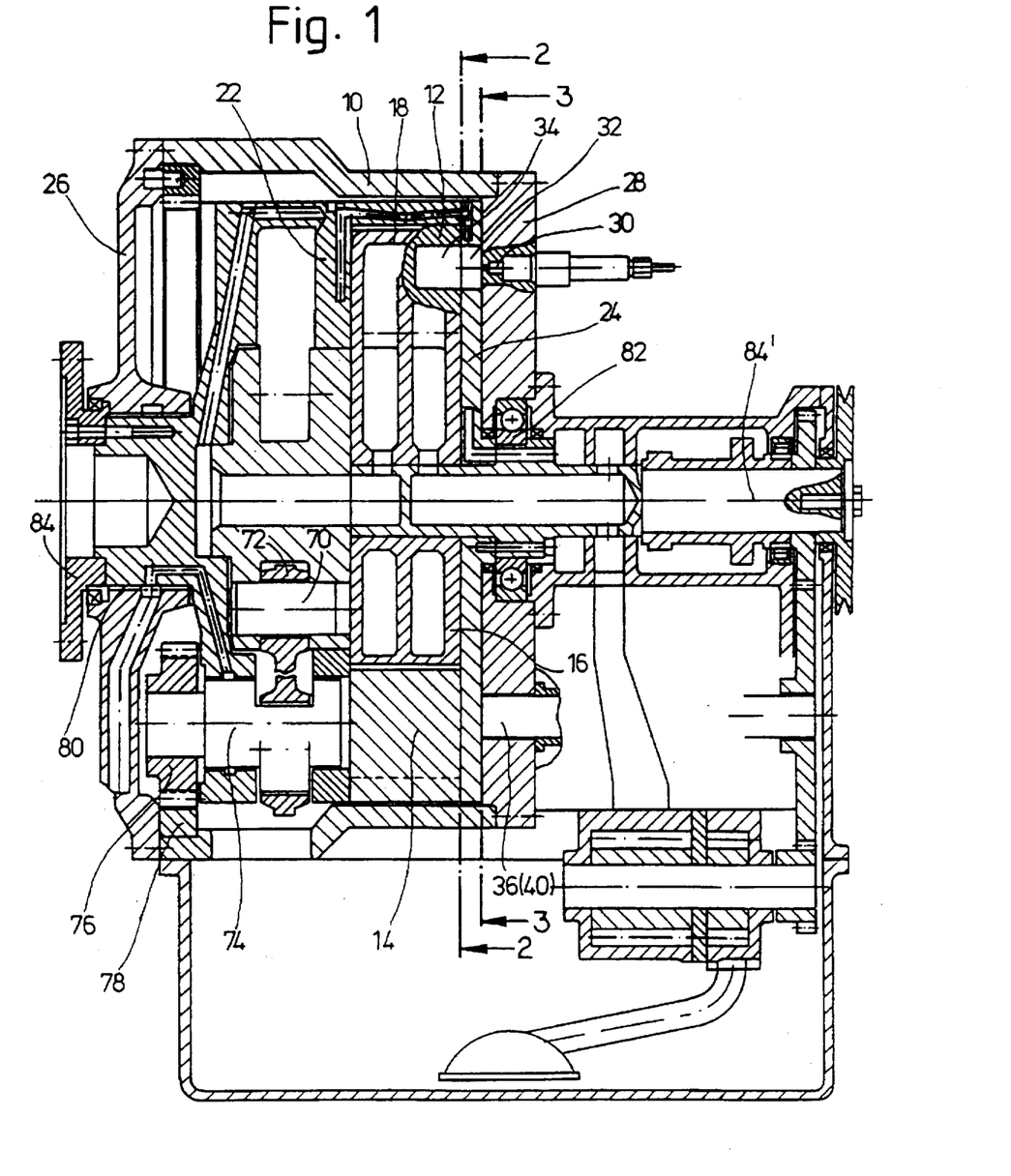
FIG. 1 is an axis longitudinal cross-sectional view of a rotary piston internal combustion engine, in particular for Diesel fuel.
Figure 2:
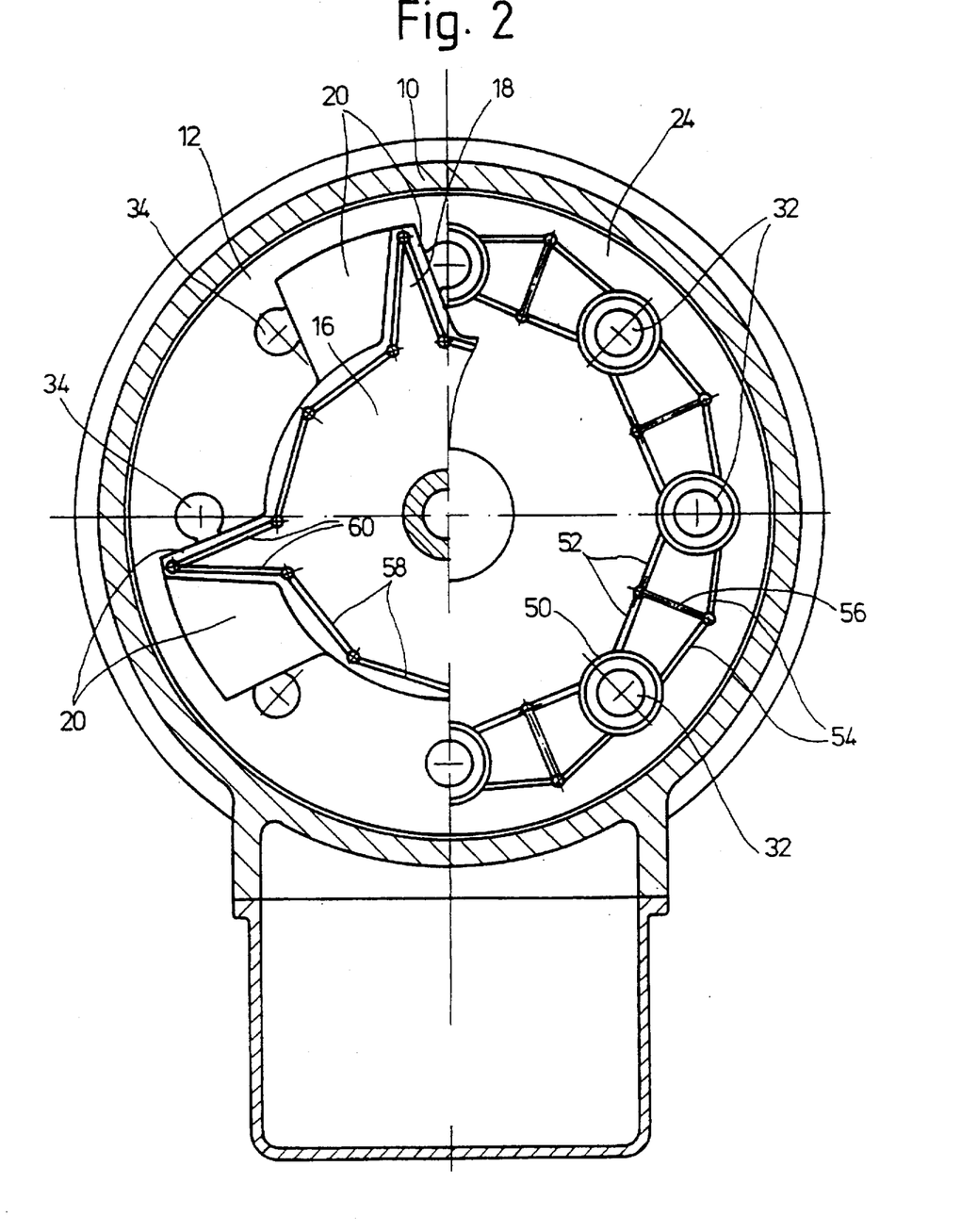
FIG. 2 is a vertical cross-sectional view along the cross-sectional line 2—2 (left) and 3—3 (right) of FIG. 1.
Figure 3:
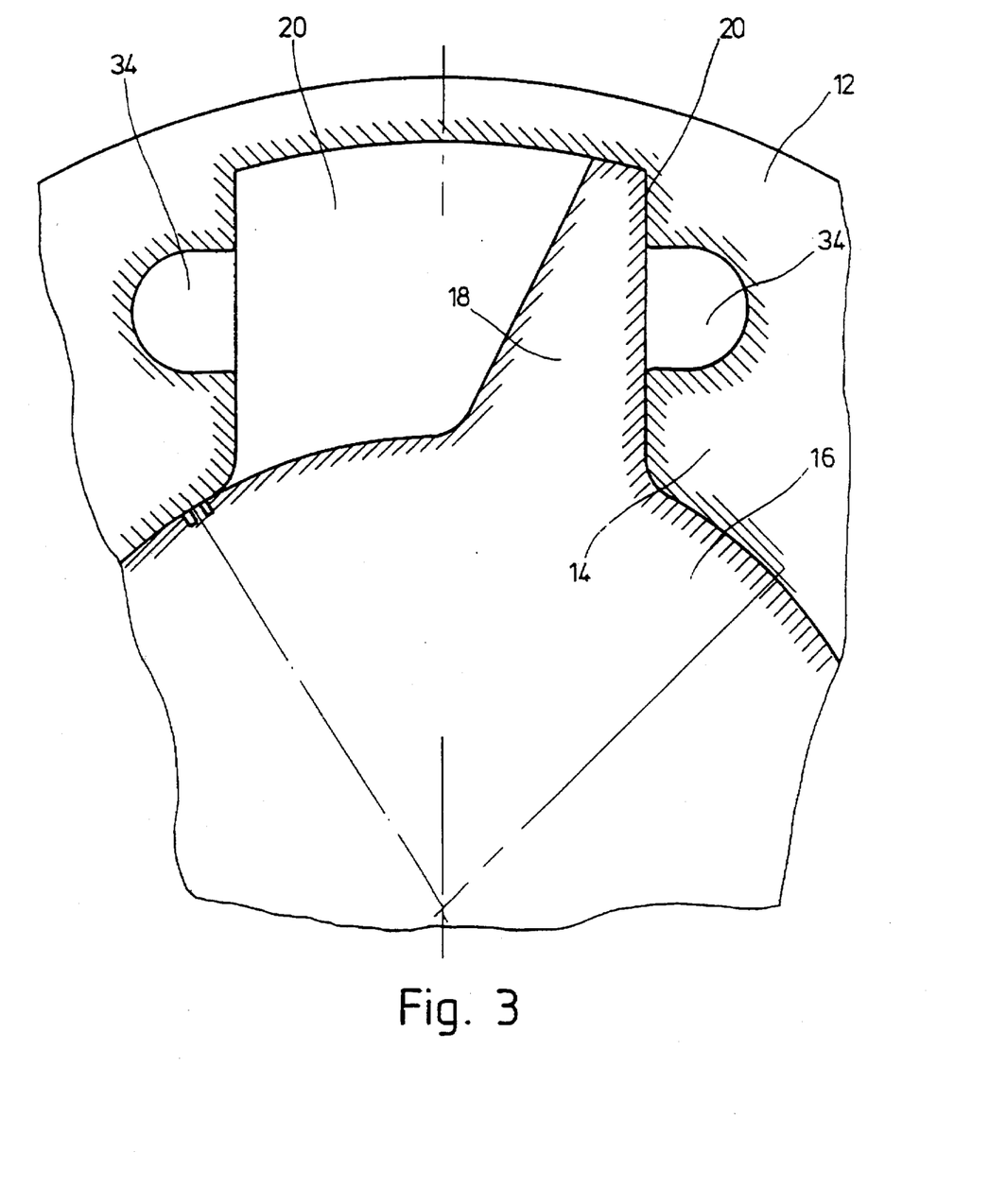
FIG. 3 is a vertical cross-sectional view of the outer rotor and the inner rotor in an enlarged illustration.
Figure 4:
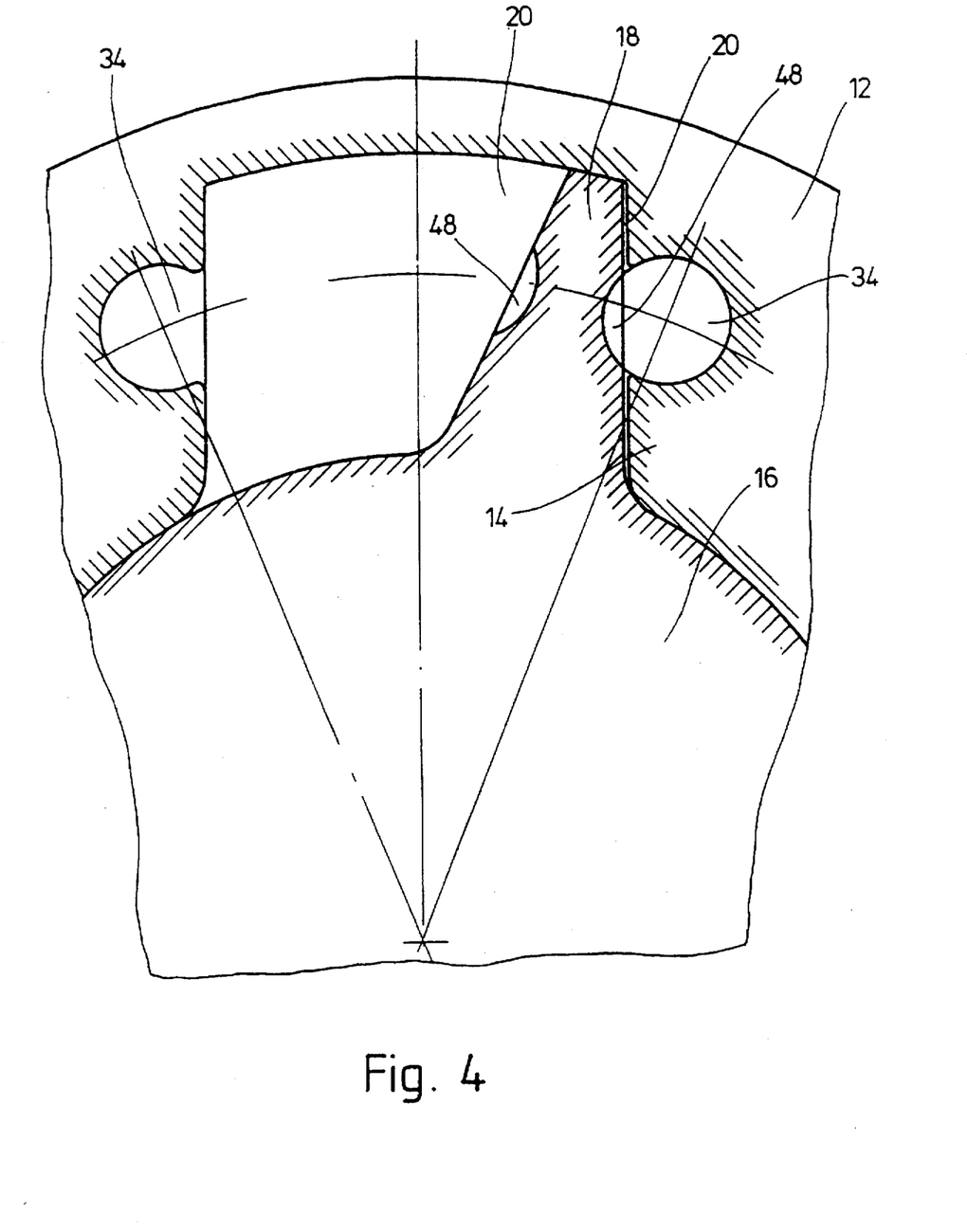
FIG. 4 is a cross-sectional view according to FIG. 3 with combustion chambers extending into the inner rotor.
Figure 5:
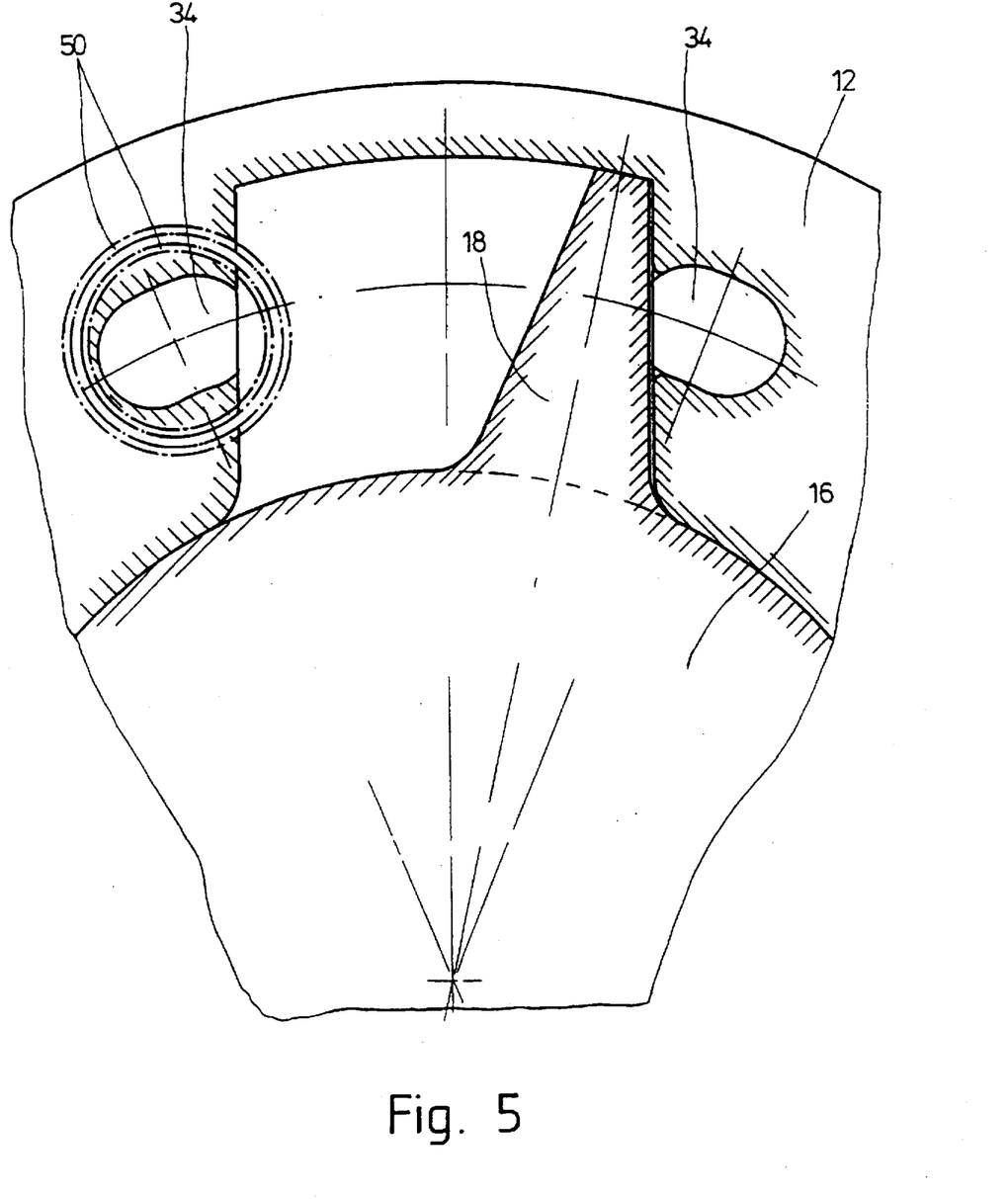
FIG. 5 is a cross-sectional view according to FIG. 3 with oval combustion chambers.
Figure 6:
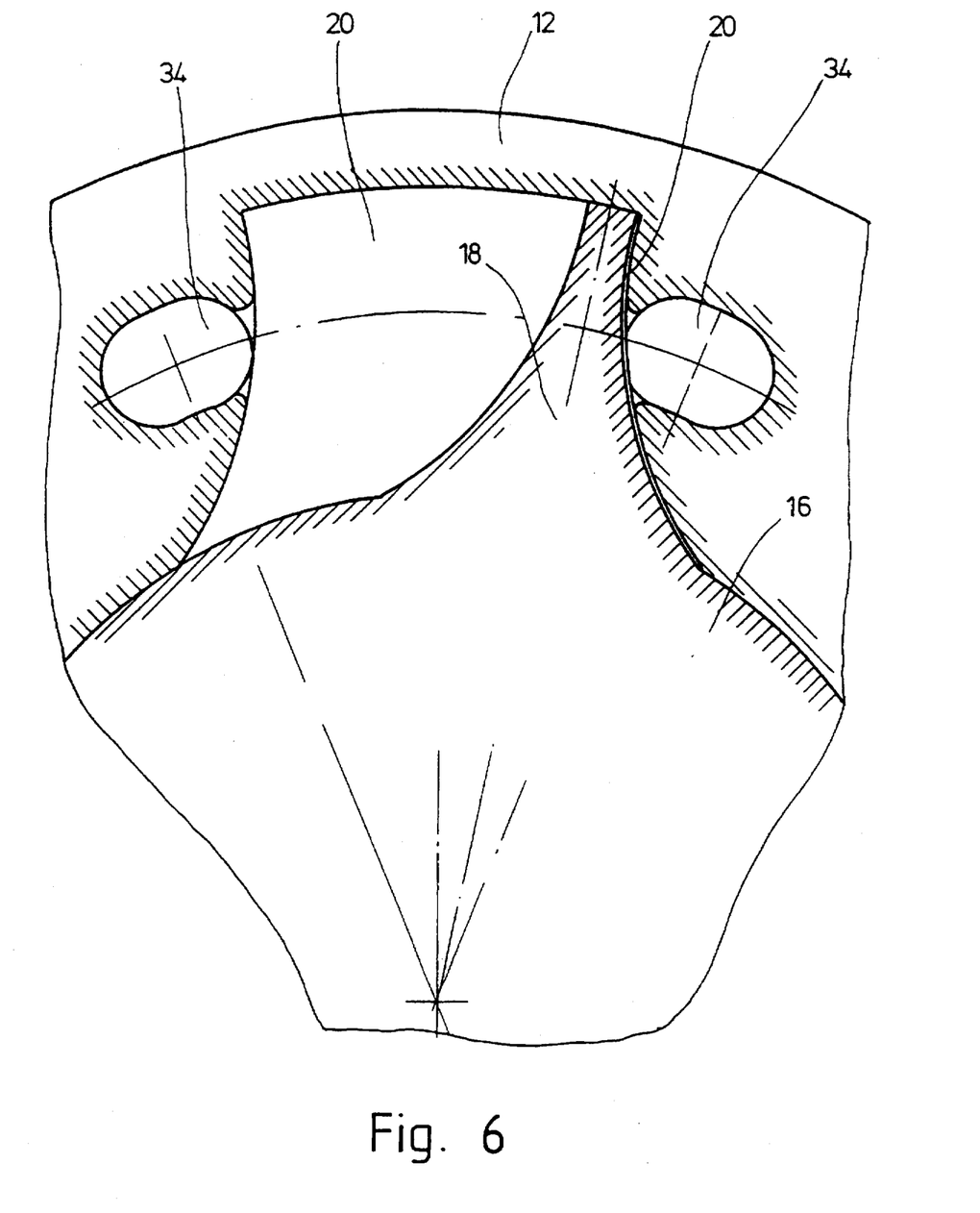
FIG. 6 is a cross-sectional view according to FIG. 3 with curved piston and opposed piston flanks.

The control windows 32 can either be circular (FIG. 4) or can be designed as an oval elongated in direction of the inscribed circle 46 on the rotor disk 24 corresponding to the combustion chambers 34 shown in FIGS. 5 and 6. The combustion chambers 34 are accordingly designed either as circular-cylinders (FIGS. 3 and 4) or oval-cylinders (FIGS. 5 and 6). The combustion chambers 34 are each arranged in pairs parallel to the axis in the pistons 14, so that they are open at the edge on the side of the piston flanks toward the adjacent working chamber 20. As can be seen from FIG. 1, they extend only over a portion of the axial dimension of the outer rotor 12. In the case of the exemplary embodiment illustrated in FIG. 4, the opposed pistons 18 have at their flanks at the height of the combustion chambers 34 partial cylindrical recesses 48. The cylindrical recesses together with the combustion chambers 34 in the piston 14 form a full cylinder.

The pistons 14 and the opposed pistons 18 have, in the exemplary embodiment according to FIG. 6, flanks arched complementarily convexly or concavely with respect to one another, and which result in a desired protuberance of the combustion chambers 34 near the flanks.

Figure 11:
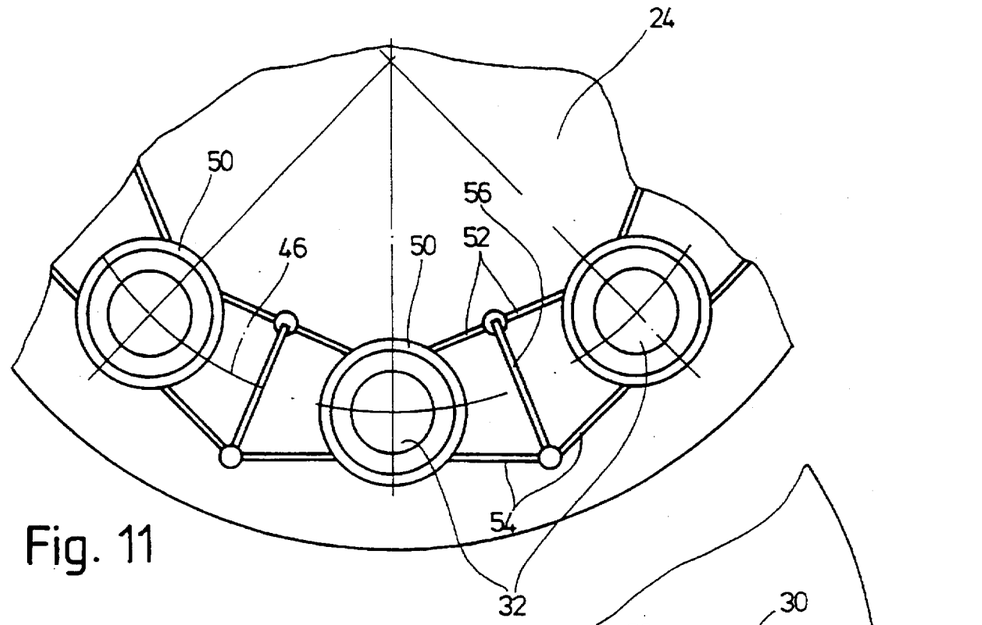
FIG. 11 is a sectional top view of the rotor side disk with control windows and sealing parts on the drive opposing side.

In order to seal the working chambers 20 and the associated combustion chambers 34 against one another and with respect to the housing lid 28, sealing bars 50, 52, 54, 56 are arranged in associated grooves on the outside of the rotor side disk 24 on the drive opposing side. The sealing bars bridge the gap to the adjacent housing lid 28 on the drive opposing side. The annular sealing bars 50 are thereby each arranged concentrically with respect to one of the control windows 32, whereas the straight sealing bars 52 and 54 connect the adjacent sealing rings 50 on a radially inner and a radially outer line and thus define a sealed area for the inlet and outlet openings 36, 40, by closing off the sealed area to the outside and to the inside. A sealing bar 56 is arranged centrally between the sealing rings 50 and is radially aligned, thereby preventing an overflow between the adjacent outlet and inlet openings 40, 36. In place of the seals 52, 54 composed of several individual bars, it is possible, in particular in the case of small motors, to also use one-piece sealing rings, thus requiring fewer joints.

Also, the inner rotor at its surfaces facing the rotor disks 22 and 24 has a polygon sealing ring composed of sealing bars 58, 60. This sealing ring enables, in the area of the acute-angled converging sealing bars 60, lubrication up to the opposed piston tip. To improve the sealing action it is also possible to provide two or more trains of sealing bars extending parallel side-by-side.

Figure 7:
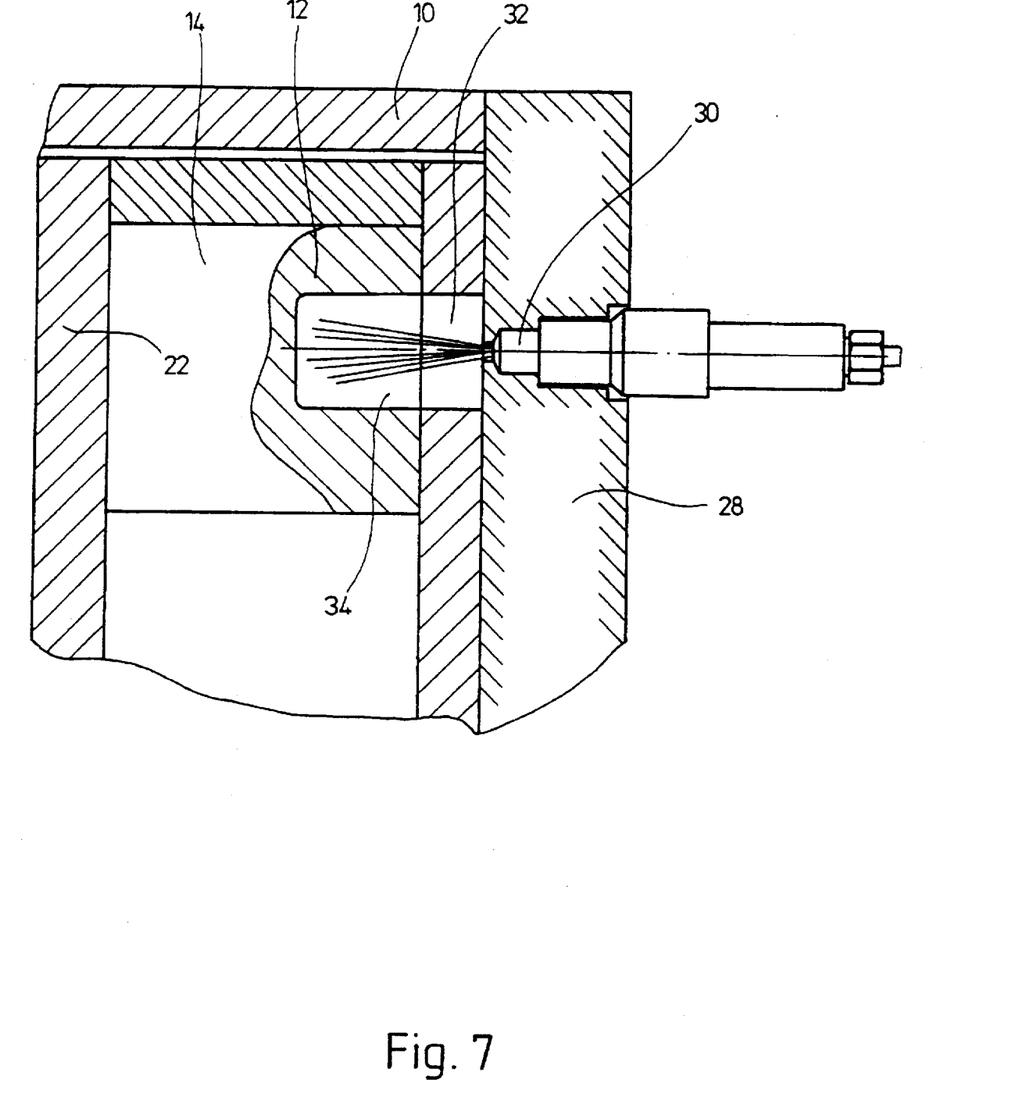
FIG. 7 is an enlarged section of FIG. 1 with an axis-parallel injection nozzle.
Figure 8:
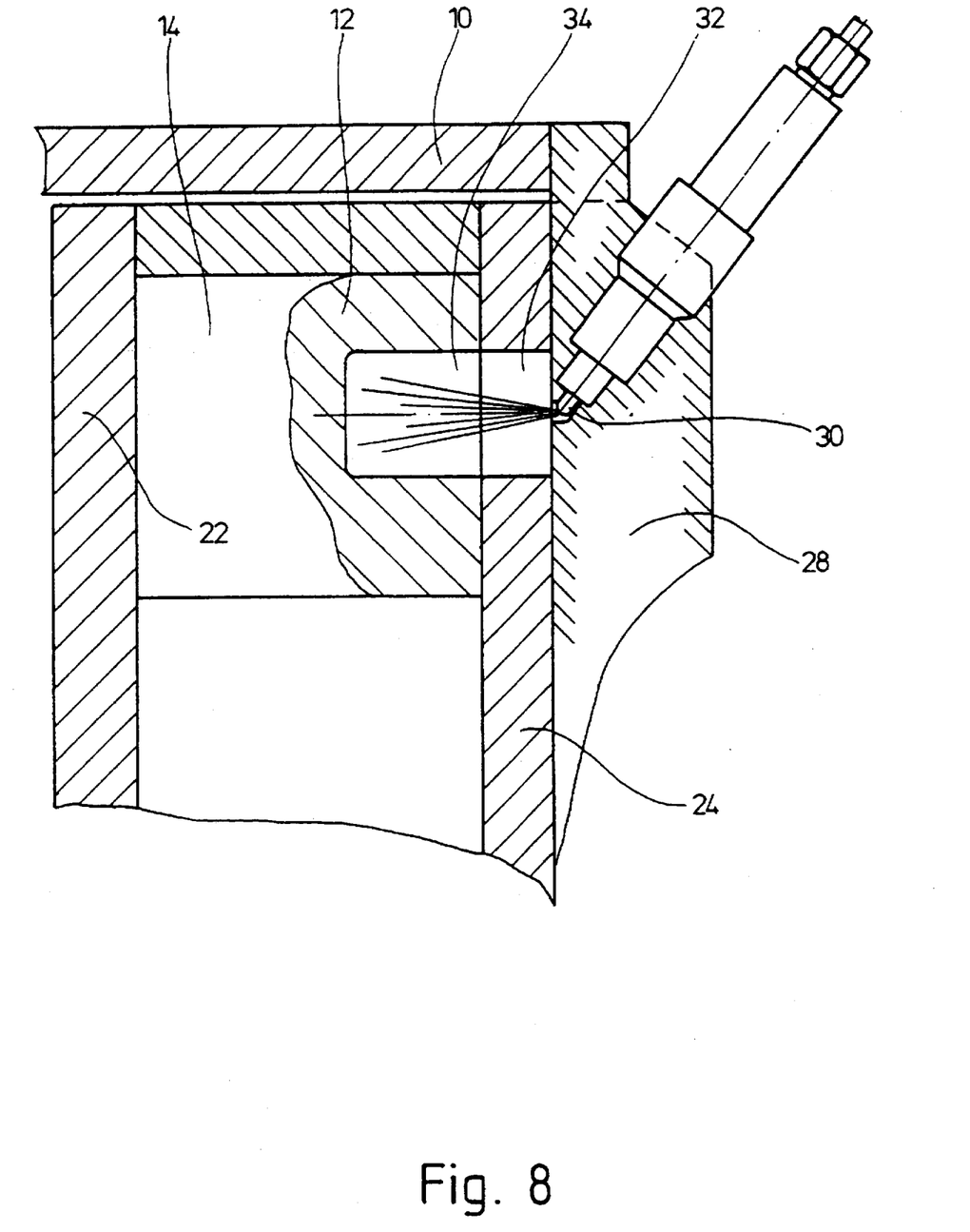
FIG. 8 is an illustration according to FIG. 7 with an inclined injection nozzle.
Figure 9:
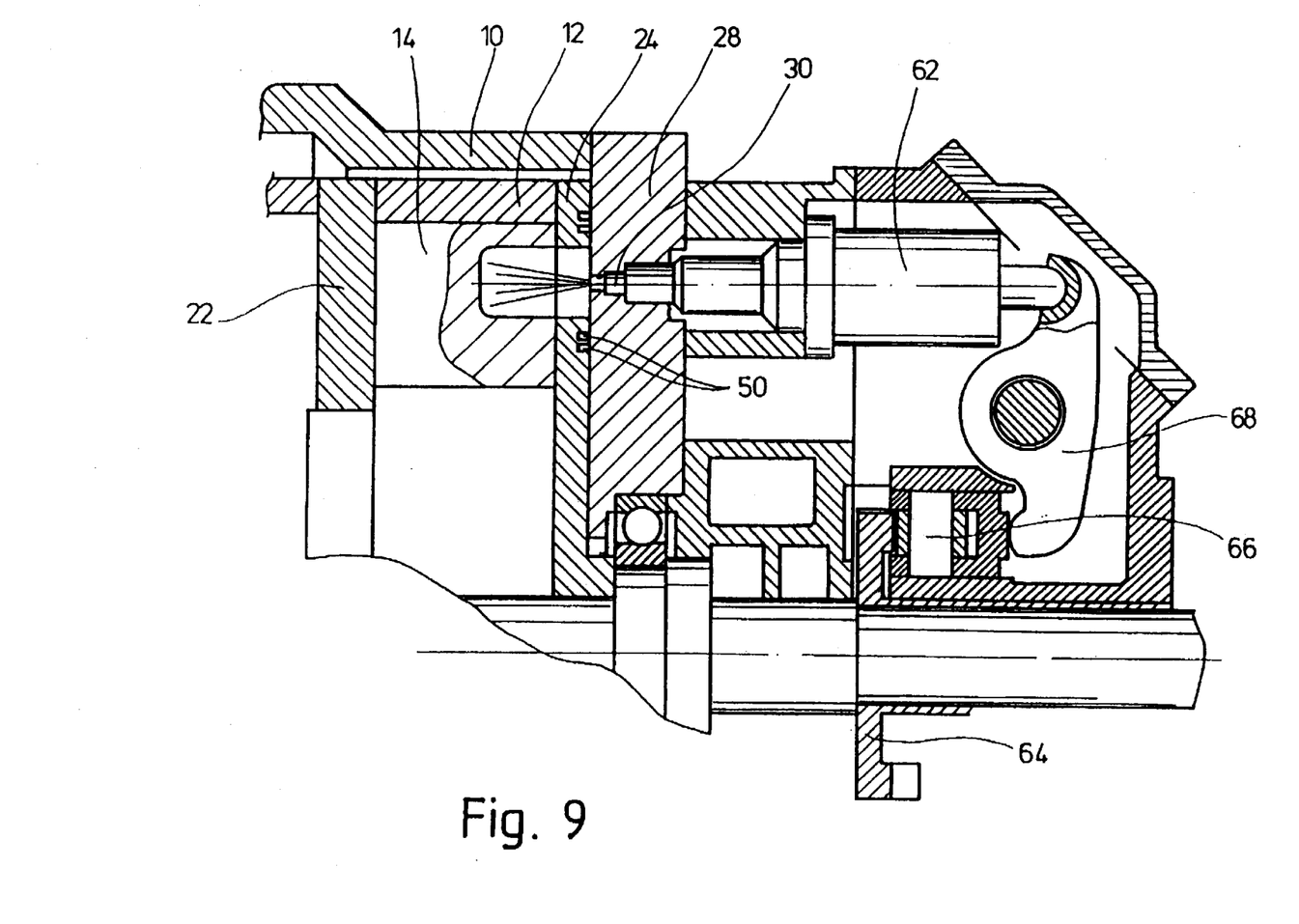
FIG. 9 is a cross-sectional view according to FIG. 7 with a pump nozzle driven by a cam plate.

The injection nozzles can be designed either as peg or hole nozzles aligned parallel to the axis (FIGS. 1 and 7), or as hole nozzles arranged inclined in the housing lid (FIG. 8). To increase the injection pressure pump nozzles 62 can also be provided, which can be operated through a cam plate 64 driven through the motor shaft 84', a roller shaft 66, and a rocker arm 68.

The relative movement between the inner rotor 16 and the outer rotor 12 is transmitted with the help of four connecting rods 72 hinged to bolts 70 of the inner rotor 16 to the four crankshafts 74 and is converted into a rotary movement. Gears 76, which are connected to the crankshafts 74 on the front side, mate with the teeth of an internally toothed annular gear 78, which is connected to the housing lid 26 on the drive side, and transfer thus the rotary movement of the crankshafts 74 into a rotary movement of the outer rotor 12 relative to the rotor housing 10. The rotor rotation can be transmitted by means of a driven shaft 84, 84', which is connected in one piece with the rotor side disk 22 on the drive side, and is supported on the bearings 80, 82' of the housing lids 26, 28, onto a consumer.

In conclusion the following is to be stated: A rotary piston internal combustion engine operating on the basis of the cat and mouse principle is suggested, in which the charge is exchanged axially through one of the housing lids 28 and the adjacent rotor side disk 24. The combustion chambers 34 are formed in the pistons 24 of the outer rotor 12 through axially open recesses, which communicate transversely thereto with the adjacent working chambers 20. The fuel is supplied in the case of the Diesel motor through injection nozzles 30, which are aligned in direction of the rotor side disk 24 in the respective housing lid 28.

The embodiments of the invention in which an exclusive property or privilege is claimed are defined as follows:

1. An internal combustion engine with pistons that rotate around a center axis, comprising a cylindrical rotor housing closed off by a housing lid on a drive side and on a drive-opposing side of the rotor housing respectively, an outer rotor rotating at a constant speed in the rotor housing about the center axis and carrying a rotor side disk on the drive side and on the drive-opposing side respectively, an inner rotor rotating with an irregular speed inside of the outer rotor about the center axis, the outer rotor having more than one radially inwardly projecting pistons rigidly connected with one another, the inner rotor having a number of radially outwardly projecting pistons rigidly connected with one another, each piston of the inner rotor being received between two adjacent pistons of the outer rotor thereby defining two working chambers between the two mutually adjacent pistons of the outer rotor, a combustion chamber directly communicating with each working chamber, a plurality of control windows extending through one of the rotor side disks, stationary inlet and outlet openings communicating alternately through the respective control window into each combustion chamber, the stationary inlet and outlet openings being arranged spacially from one another along a first theoretical circle in one of the housing lids, the control windows being arranged along a second theoretical circle, the second circle having a radius corresponding to the first circle, the one rotor side disk having a first flat surface, the one housing lid having a second flat surface facing the first flat surface, a gap being defined between the first and second flat surfaces, sealing bars slidingly engaging at least one of the flat surfaces on the one rotor side disk and the one housing lid, the sealing bars surrounding the control windows, to define a sealed area between the control windows through which the stationary inlet and outlet openings fluidly communicate with the control windows, the sealing bars axially bridging the gap between the one rotor side disk and the one housing lid, and the combustion chambers being formed by recesses in the pistons of the outer rotor, the recesses being axially open in a direction toward the control windows and communicating with the adjacent working chambers transversely to an axial direction of the recesses.

2. The internal combustion engine according to claim 1, wherein the inlet and outlet openings are arranged in the housing lid on the drive-opposing side and the control windows are in the rotor side disk on the drive-opposing side.

3. The internal combustion engine according to claim 1, wherein the control windows have one of a circular contour and an oval contour elongated in peripheral direction of the second theoretical circle.

4. The internal combustion engine according to claim 1, wherein the combustion chambers are formed by one of an essentially circular-cylinder hollow space and an essentially oval-cylinder hollow space, and have an outer surface open at an edge of the combustion chambers toward a side of the adjacent working chamber.

5. The internal combustion engine according to claim 4, wherein the combustion chambers extend over a fraction of the axial length of the outer rotor.

6. The internal combustion engine according to claim 4, wherein the edge of the combustion chamber is open over the entire height of the combustion chamber toward the adjacent working chamber.

7. The internal combustion engine according to claim 1, wherein flanks of the pistons of the inner rotor facing the outer rotor pistons have an edge-open recess opening correspondingly toward the adjacent combustion chamber.

8. The internal combustion engine according to claim 1, wherein one of the stationary inlet and outlet openings has an oval contour elongated in a peripheral direction of the first theoretical circle.

9. The internal combustion engine according to claim 8, wherein the elongated outlet openings are divided in the peripheral direction of the first theoretical circle forming a preoutlet and a main outlet, which are sealed off against one another and are connected to various outlet channels.

10. An internal combustion engine according to claim 1, wherein at least one essentially radially aligned sealing bar is arranged in an area between the control windows connecting the sealing bars lying radially inside and outside of the control windows.

11. An internal combustion engine according to claim 1, wherein the one housing lid consists of a light metal and carries a hard-material coating at least in the surface area whereon the sealing bars contact against said lid.

12. An internal combustion engine according to claim 1, wherein an injection nozzle is positioned in the area between each inlet opening and outlet opening of the respective one housing lid, the nozzle being aligned in a direction toward the rotor side disk.

13. An internal combustion engine according to claim 12, wherein the injection nozzle is a peg-type nozzle.

14. An internal combustion engine according to claim 12, wherein the injection nozzle is one of an axis-parallel hole-type nozzle and an inclined mounted hole-type nozzle.

15. An internal combustion engine according to claim 12, wherein the injection nozzle is a pump nozzle, and wherein a cam plate driven by the outer rotor through a roller shaft and a rocker arm controls the pump nozzle.

16. The internal combustion engine according to claim 1, wherein a spark plug is arranged in the area between each of the inlet openings and the outlet openings in the housing lid.

17. The internal combustion engine according to claim 1, wherein flanks of the pistons of the outer rotor are curved convexly adjacent the combustion chamber outer surface opening and the opposed pistons of the inner rotor are curved correspondingly concavely.

18. The internal combustion engine according to claim 1, wherein a driving mechanism is arranged on the drive side of the rotor housing and is coupled to the rotor side disk on the drive side.

19. The internal combustion engine according to claim 1, wherein the sealing bars annularly surround each control window.

20. The internal combustion engine according to claim 1, wherein the sealing bars are secured in grooves on the one rotor side disk and the sealing bars slidingly seal against the flat surface of the one housing lid.

21. The internal combustion engine according to claim 1, wherein a spark plug is arranged in an area of the control windows of the outer rotor.

* * * * *